(12) United States Patent
Kim et al.

(10) Patent No.: US 10,471,286 B2
(45) Date of Patent: Nov. 12, 2019

(54) SYSTEMS AND METHODS FOR IMPROVING EFFICIENCY OF FIREFIGHTING ROBOTS

(71) Applicants: Jeong-Wan Kim, West Lafayette, IN (US); James Eric Dietz, Lafayette, IN (US); Eric T. Matson, Lafayette, IN (US)

(72) Inventors: Jeong-Wan Kim, West Lafayette, IN (US); James Eric Dietz, Lafayette, IN (US); Eric T. Matson, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 253 days.

(21) Appl. No.: 15/358,592

(22) Filed: Nov. 22, 2016

(65) Prior Publication Data

US 2017/0144006 A1 May 25, 2017

Related U.S. Application Data

(60) Provisional application No. 62/259,261, filed on Nov. 24, 2015.

(51) Int. Cl.
*A62C 27/00* (2006.01)
*B25J 5/00* (2006.01)
*B25J 11/00* (2006.01)

(52) U.S. Cl.
CPC .............. *A62C 27/00* (2013.01); *B25J 5/005* (2013.01); *B25J 11/00* (2013.01); *Y10S 901/01* (2013.01)

(58) Field of Classification Search
CPC ......... A62C 27/00; A62C 29/00; A62C 35/68; A62C 37/00; A62C 37/38; B25J 5/005; B25J 11/00; Y10S 901/01
USPC ....... 169/24, 46, 52, 56, 60, 61; 137/625.21, 137/625.22, 625.24
See application file for complete search history.

(56) References Cited

U.S. PATENT DOCUMENTS

| | | | |
|---|---|---|---|
| 2,561,296 A | 7/1951 | Stout | |
| 2,975,799 A | 3/1961 | Stilwell | |
| 3,762,478 A * | 10/1973 | Cummins | ............... A62C 27/00 169/24 |

(Continued)

FOREIGN PATENT DOCUMENTS

CA 2012369 9/1991

*Primary Examiner* — Darren W Gorman
(74) *Attorney, Agent, or Firm* — Hartman Global IP Law; Gary M. Hartman; Domenica N. S. Hartman

(57) ABSTRACT

A system and method suitable for improving the efficiency of a firefighting robot by managing a water supply in a hose coupled thereto is provided. The system includes a robot capable of self-propulsion. The robot is coupled to at least a first hose and is capable of receiving water through the first hose from a water source and discharging the water towards a fire to extinguish the fire. The system includes at least a first valve unit fluidically coupling the first hose to the water source, and means for controlling the robot and the first valve unit such that the first valve unit prevents the robot from receiving water from the water source and drains water from within the first hose when the robot maneuvers and provides water to the robot through the first hose from the water source when the robot is extinguishing the fire.

20 Claims, 12 Drawing Sheets

(56) References Cited

U.S. PATENT DOCUMENTS

| | | | | |
|---|---|---|---|---|
| 5,860,479 | A * | 1/1999 | LaFollette | A62C 27/00 169/24 |
| 6,253,791 | B1 * | 7/2001 | Miklo | F16K 11/0873 137/625.47 |
| 7,264,062 | B1 * | 9/2007 | Ham | A62C 27/00 169/24 |
| 7,647,944 | B1 | 1/2010 | Howerton | |
| 8,201,553 | B2 * | 6/2012 | Pussell | F16K 11/0876 126/585 |
| 8,381,826 | B2 * | 2/2013 | Al-Azemi | A62C 27/00 169/51 |
| 8,973,671 | B2 * | 3/2015 | Alsaif | A62C 27/00 169/24 |
| 2012/0285706 | A1 * | 11/2012 | McLoughlin | A62C 27/00 169/24 |

* cited by examiner

SYSTEMS AND METHODS FOR IMPROVING EFFICIENCY OF FIREFIGHTING ROBOTS

CROSS REFERENCE TO RELATED APPLICATIONS

This application claims the benefit of U.S. Provisional Application No. 62/259,261, filed Nov. 24, 2015, the contents of which are incorporated herein by reference.

BACKGROUND OF THE INVENTION

This disclosure generally relates to systems and methods and for improving the efficiency of firefighting robots. The disclosure particularly relates to systems and methods for managing a water supply to a firefighting robot to improve its operating efficiency.

Every year, fires cause numerous deaths and significant property damage. For example, FIG. 1 shows estimated property damages in the United States of America for the years of 2003 to 2012, and FIG. 2 shows a number of firefighter deaths while on-duty in the United States of America for the years of 2005 to 2014. According to the United States Fire Administration, current estimates state that an average of 82.9 firefighters die in fires each year. Various solutions have been proposed in attempts to reduce casualties and property damage caused by fire. One solution currently available is the use of firefighting robots that substitute for firefighters on a fire scene, for example, a building that is on fire. Use of these robots may not only decrease the risk of life-threatening situations for firefighters but also can potentially extinguish a fire faster in an area that may be inaccessible to a firefighter. Such robots have the potential to significantly reduce the need for firefighters to work in hazardous areas and may improve firefighting capabilities.

Although firefighting robots have certain advantages, their effectiveness can be reduced by various limitations. As an example, these robots are generally powered with onboard energy storage devices, such as batteries, which have a limited amount of energy that may be used to power the robots. Current firefighting robots are in general relatively heavy devices and, even with an advertised eight-hour battery life, may only last around two hours in the field under normal operating conditions, including moving from location to location to extinguish fires. These robots are often not very agile and waste energy by having to maneuver around the fire scene while carrying a pressurized hose that couples the robot to a source of water for use in extinguishing the fire. This unwieldiness and inefficiency often diminish the advantages of the robots.

Thus there is an ongoing desire for systems and methods capable of improving the efficiency of firefighting robots by increasing the duration of operation for a given set of conditions while operating on a limited power source.

BRIEF DESCRIPTION OF THE INVENTION

The present invention provides systems and methods capable of improving the efficiency of a firefighting robot by managing water supplied to the robot.

According to one aspect of the invention, a system is provided that includes a robot capable of self propulsion. The robot is coupled to at least a first hose and is capable of receiving water through the first hose from a water source and discharging the water towards a fire to extinguish the fire. The system includes at least a first valve unit fluidically coupling the first hose to the water source, and means for controlling the robot and the first valve unit such that the first valve unit prevents the robot from receiving water from the water source and drains water from within the first hose when the robot maneuvers and provides water to the robot through the first hose from the water source when the robot is extinguishing the fire.

According to another aspect of the invention, a method is provided that includes deploying a robot to fight a fire with water from a water source, the water passing to the robot through a first hose coupled to the robot, the first hose being fluidically coupled via at least a first valve unit to the water source, providing the water to the robot through the first valve unit and the first hose when the robot is discharging the water from the water source toward a fire, and preventing the robot from receiving the water from the water source and draining the water from the first hose through the first valve unit when the robot is maneuvering.

Technical effects of the method and system described above preferably include the ability to operate a firefighting robot for longer periods of time between recharging a power supply of the robot by reducing the weight on the robot when it is moving between locations under its own power.

Other aspects and advantages of this invention will be further appreciated from the following detailed description.

DETAILED DESCRIPTION OF THE INVENTION

In this disclosure, firefighting systems and methods are provided that are intended to improve the energy efficiency and operating time of a firefighting robot by managing the water in a fire hose coupled to the robot. The firefighting system may include a controller for remotely operating the robot and at least one valve unit coupled to the fire hose. The valve unit is preferably a wireless valve unit that may include, but is not limited to, a valve, a wireless receiver, and a motor to control the operation of the valve unit. The valve unit is preferably capable of selectively providing water from a water source to the firefighting robot through a fire hose or draining water from the hose. The system preferably improves the traction efficiency of a firefighting robot by decreasing the weight of the fire hose during movement of the robot. In particular, whenever the robot is ready to be maneuvered to another location, the system can assist in removing some if not substantially all of the water within the fire hose, thereby reducing the weight that must be towed by the robot during movement. As a result, the system enables the robot and a fire hose coupled thereto to efficiently reach a desired destination with reduced energy cost, and in so doing is able to extend the operating time of the robot if powered by an onboard power source, such as a battery.

Figure 1:
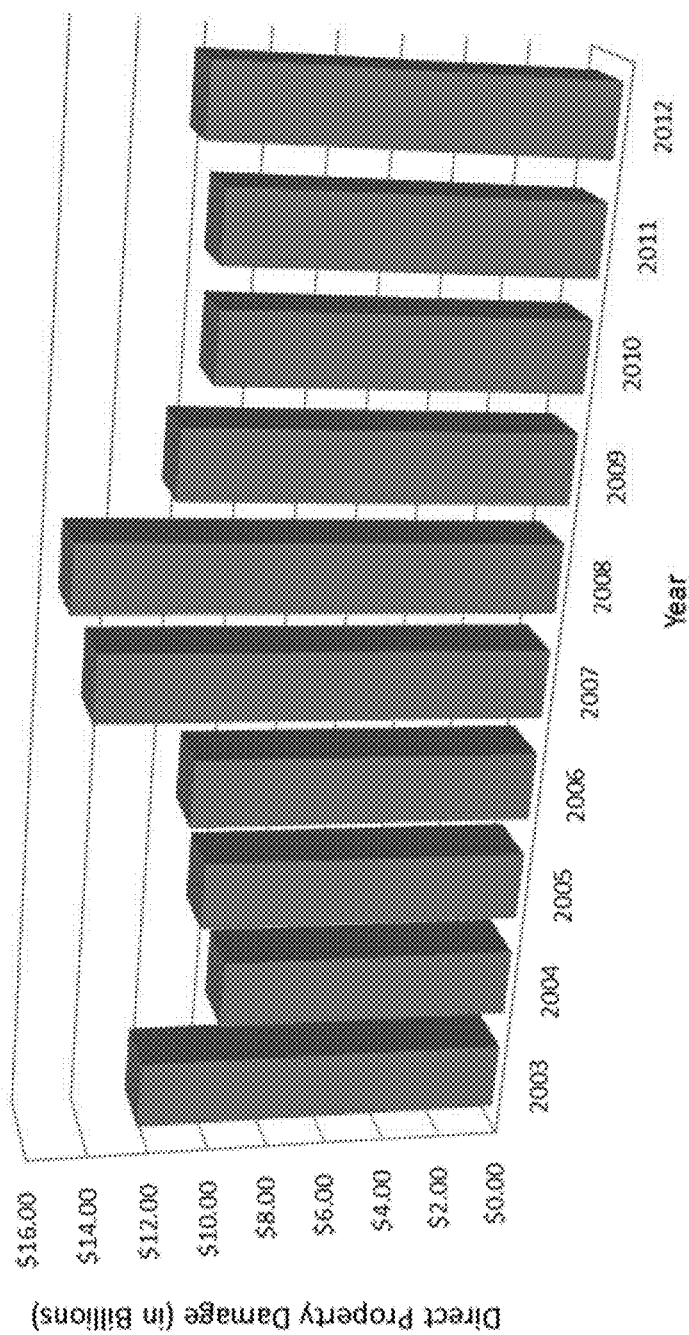
FIG. 1 represents estimated property damages due to fire in the United States of America for the years of 2003 to 2012.
Figure 2:
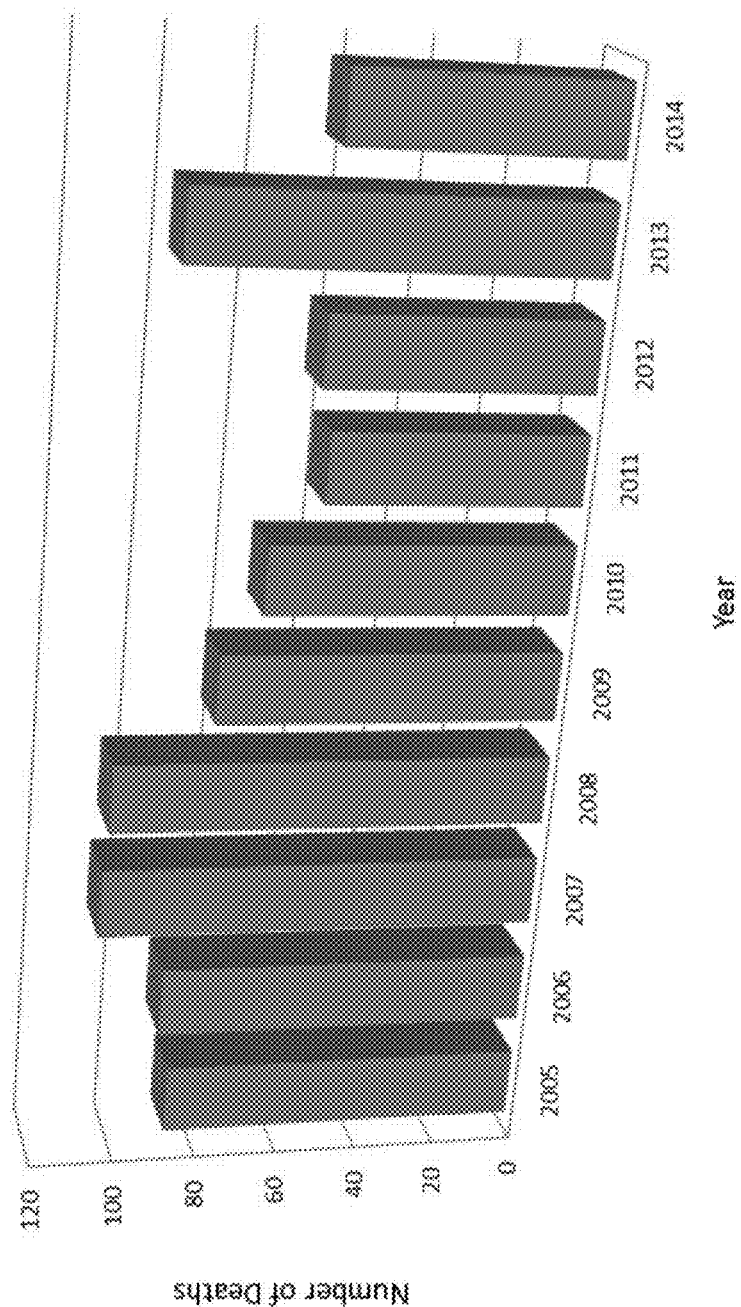
FIG. 2 represents fire fighter deaths in the United States of America for the years of 2005 to 2014.
Figure 3:
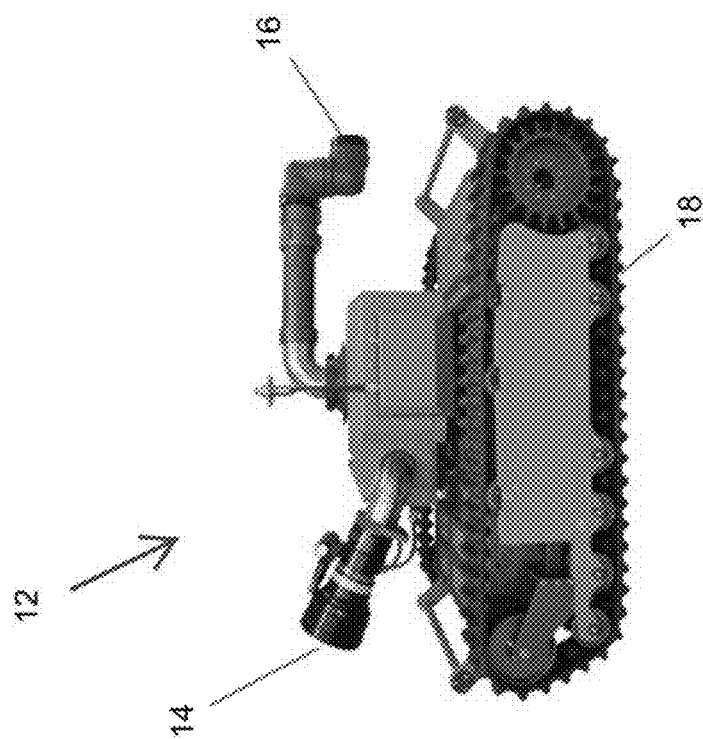
FIG. 3 schematically represents a nonlimiting firefighting robot.

The following discussion will make reference to investigations based on a nonlimiting example of a firefighting robot 12 schematically represented in FIG. 3. The robot 12 includes an inlet 16 for receiving water through a fire hose (not shown) from an external and remote water source (not shown), and an outlet (nozzle) 14 for discharging the water toward a fire in order to extinguish a fire. The robot 12 is configured for self-propulsion, for example, with wheels or tracks 18 driven by a suitable motor or other prime mover (not shown). For the purpose of performing calculations during the investigations, the robot 12 weighed 210 kg (about 463 pounds) and was powered by a 24V/40 Ah battery based on a known commercial configuration. During use, a firefighting robot is usually required to move between various locations within a fire scene to extinguish fires. With the aforementioned 24V/40 Ah battery, the robot 12 depicted in FIG. 3 would be capable of operating for a maximum of eight hours if allowed to maneuver without being coupled to a fire hose. However, when connected to a water-filled fire hose having an internal diameter of 2.5 inch (6.35 cm) and a length of 200 feet (about 61 m), the robot 12 would be able to maneuver for only about 1.5 hours due to the additional weight of the water within the hose. Consequently, during use under operating conditions at a fire scene, the robot 12 represented in FIG. 3 could not operate for an extended period of time because a significant amount of battery power would be consumed to tow the heavy fire hose each time the robot 12 moved to another location.

Figure 4:
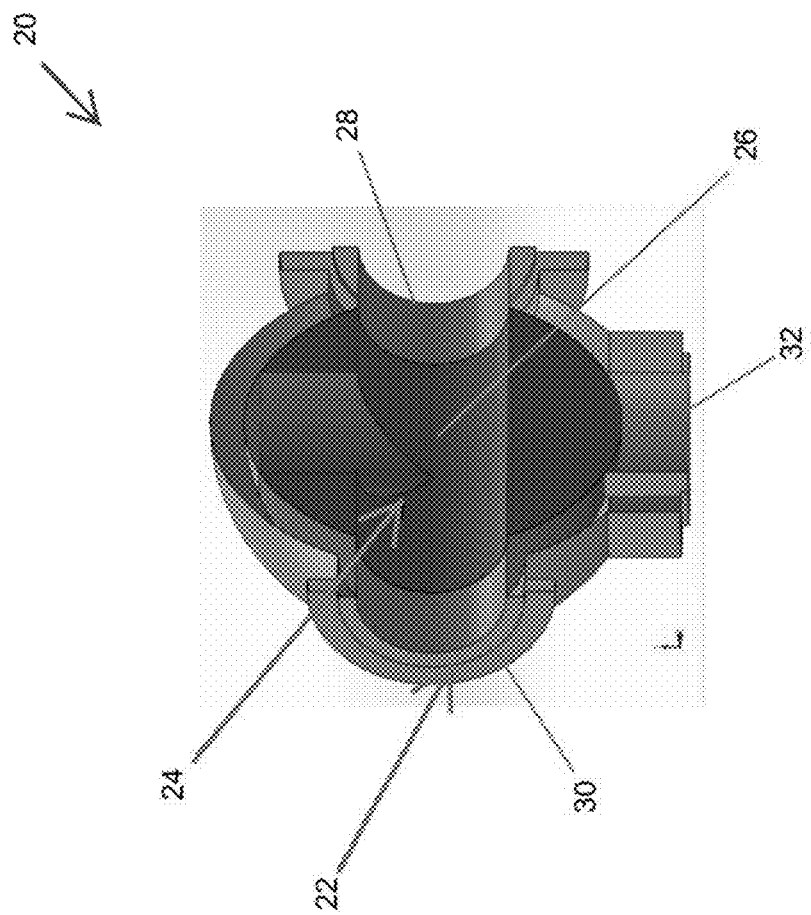
FIG. 4 is a cross-sectional view schematically representing an automatic T-valve device (ATD).

FIG. 4 schematically represents a valve unit 20 as a spherical automatic T-valve device (ATD) of a type suitable for use in a firefighting system according to nonlimiting embodiments of the invention. The valve unit 20 includes a housing 22 comprising at least first, second, and third ports 28, 30, and 32, around which flanges or other means are provided for fluidically coupling a fire hose to at least the first and second ports 28 and 30. As a matter of convenience, the first and second ports 28 and 30 will be respectively referred to as the inlet and outlet ports 28 and 30 of the valve unit 20, though these designations could be reversed. A rotating T-valve ball 24 is located within the housing 22 and is adapted to be rotated to operate the valve unit 20 by selectively aligning a passage 26 within the valve unit 20 to connect the inlet port 28 to either the outlet port 30 or the third port 32, hereinafter referred to as the discharge port 32. During operation, the inlet port 28 may be coupled to a water source through at least a first fire hose and the outlet port 30 may be coupled to the robot 12 through at least a second fire hose.

Figure 5:
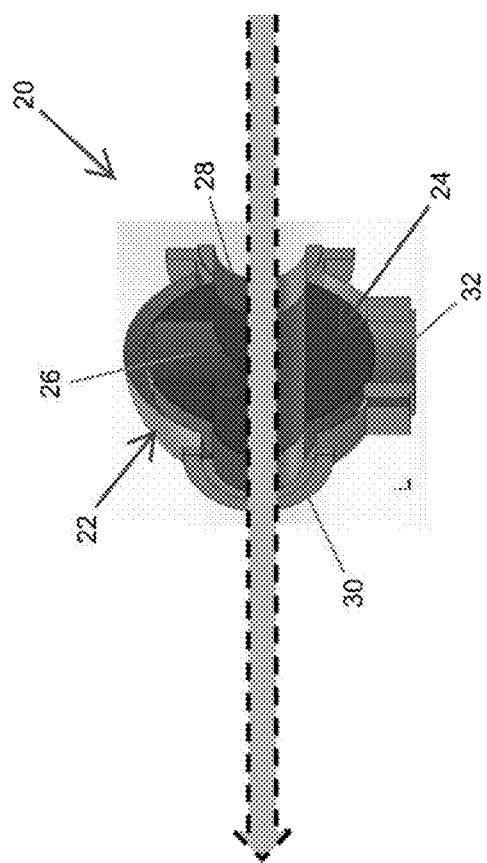
FIG. 5 is a cross-sectional view schematically representing the ATD of FIG. 4 in an open mode with water flowing therethrough.
Figure 6:
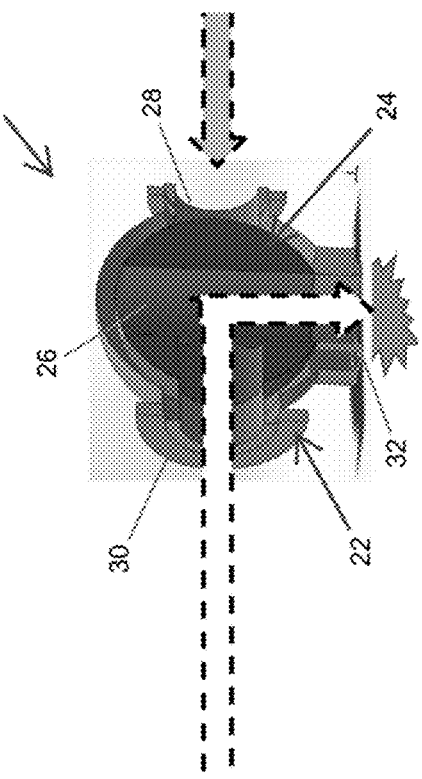
FIG. 6 is a cross-sectional view schematically representing the ATD of FIG. 4 in a discharge mode with water being discharged therefrom.

FIG. 5 schematically represents the valve unit 20 of FIG. 4 in an open mode or orientation wherein the passage 26 within the valve unit 20 is oriented to provide a flowpath between the inlet and outlet ports 28 and 30 that allows water to pass through the valve unit 20 and travel from a water source to the robot 12. Simultaneously, the discharge port 32 is blocked so that the water cannot exit the valve unit 20 through the discharge port 32. FIG. 6 schematically represents the valve unit 20 of FIGS. 4 and 5 in a discharge mode wherein the passage 26 is oriented to provide a path between the outlet and discharge ports 30 and 32 and block the inlet port 28. As a result, water within the fire hose between the robot 12 and valve unit 20 is able to enter the valve unit 20, pass through the passage 26, and exit the valve unit 20 through the discharge port 32, while water from the water source is prevented from entering the valve unit 20. As such, water located within the hose between the valve unit 20 and robot 12 is able to be drained from the hose under gravity via the discharge port 32. In the embodiment represented, the valve unit 20 transitions from the open mode to the discharge mode by rotating the T-valve ball 24 counterclockwise within the housing 22 relative to the view represented. As a result of setting the valve unit 20 to the discharge mode, the hose between the robot 12 and the valve unit 20 will be at least partially empty of water and therefore will weight less during movement of the robot 12. Other aspects of the valve unit 20 in FIGS. 4, 5, and 6 will be readily understood by those of ordinary skill in the art.

Figure 7:
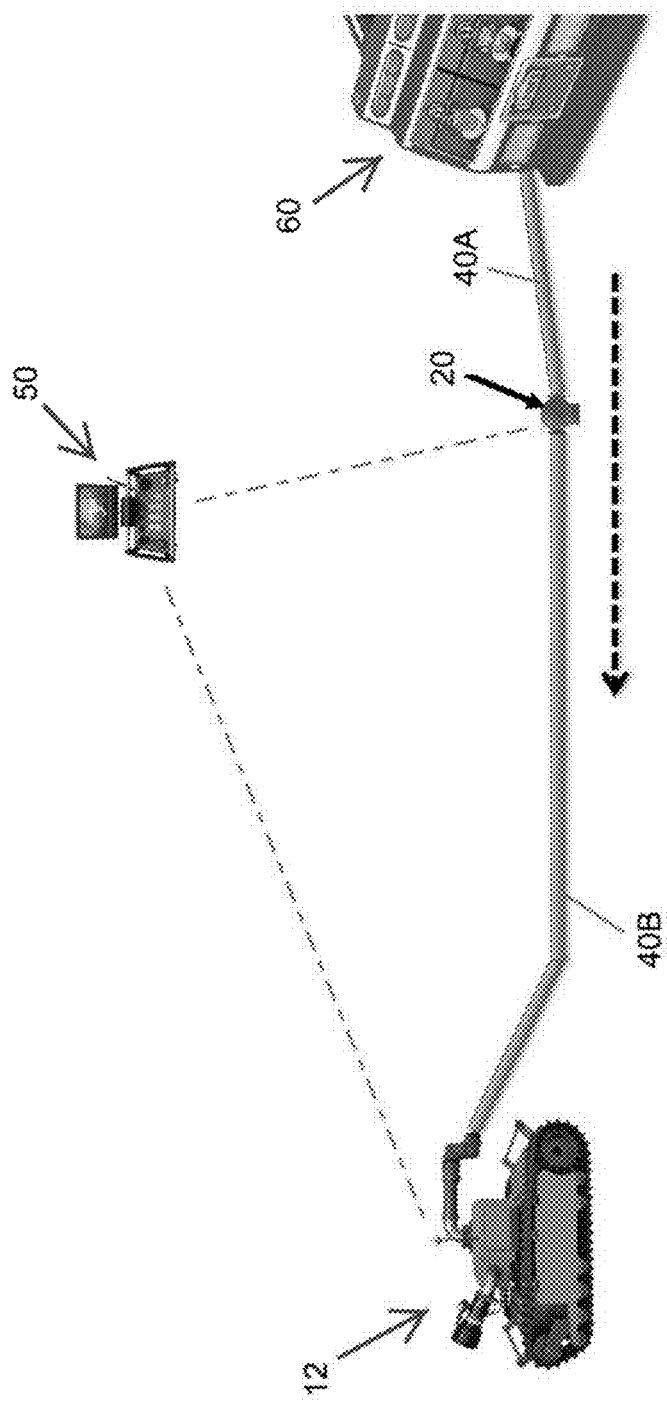
FIGS. 7 and 8 schematically represent a nonlimiting system incorporating the robot of FIG. 3, a fire hose that connects the robot to a water supply, and an ATD of the type shown in FIGS. 4 through 6 located within the hose and operating in the open and discharge modes, respectively.
Figure 8:
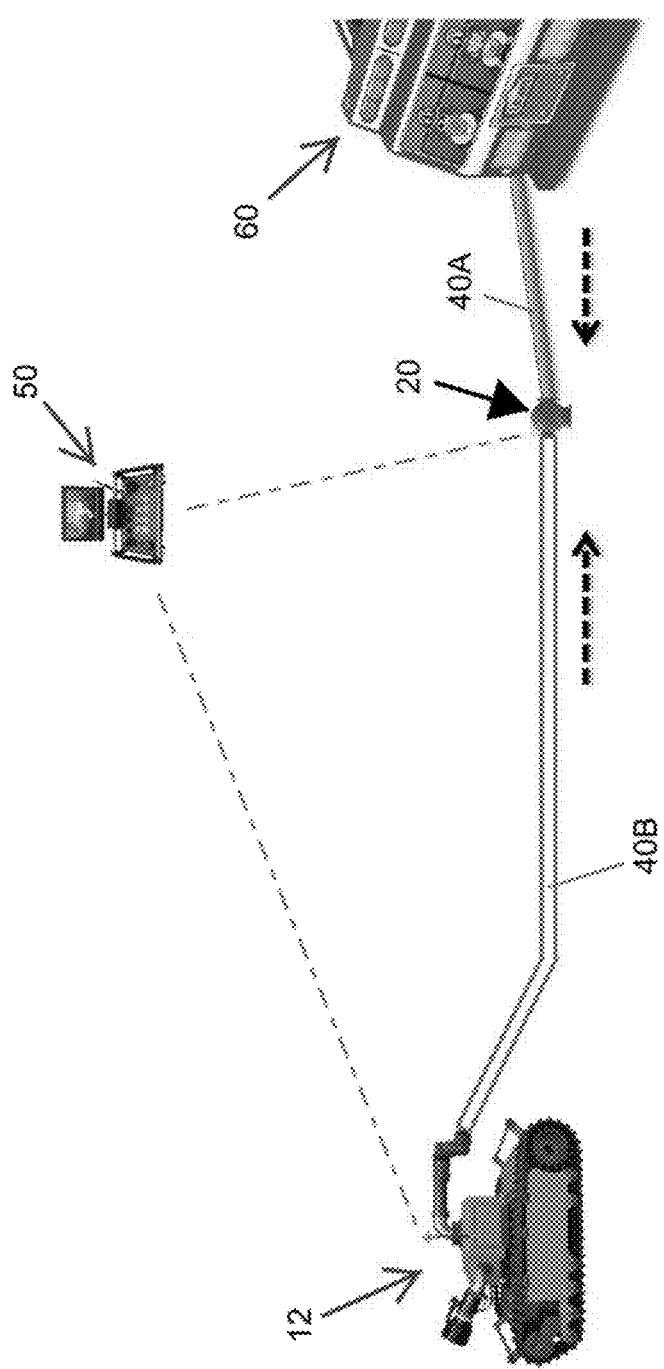
Figure 13:
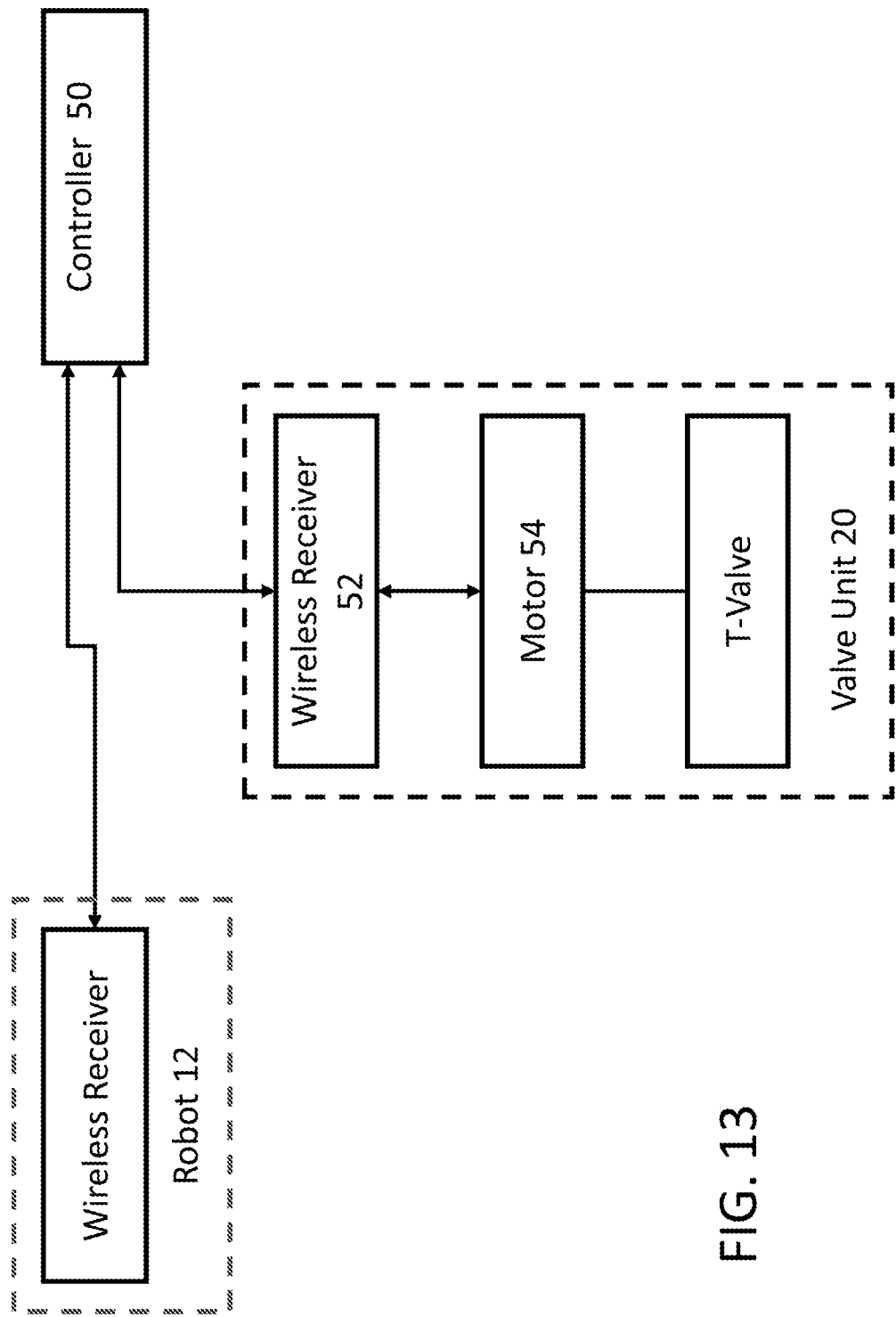
FIG. 13 is a block diagram schematically representing aspects of the system represented in FIGS. 7 and 8.

FIGS. 7 and 8 represent another nonlimiting embodiment of a system that includes the robot 12 and valve unit 20 of FIGS. 3 through 6, in combination with two fire hoses 40A and B, a wireless controller 50, and a water source (fire truck) 60. The direction of water flow within the hoses 40A and B is represented with dashed arrows. Wireless connections between the controller 50 and the valve unit 20, for example, through a wireless receiver 52 and motor 54 represented in FIG. 13 as connected to the valve unit 20, are represented with dashed lines in FIGS. 7 and 8. Although the system is described as including multiple hoses 40A and 40B connected by the valve unit 20, it is within the scope of the invention that the water source 60 may be coupled to the robot 12 with a single hose 40 comprising the valve unit 20 as an integral component. FIG. 7 represents the valve unit 20 as set to the open mode with water traveling from the water source 60 through the hose 40A to the valve unit 20, and then through the valve unit 20 and hose 40B to the robot 12. FIG. 8 represents the valve unit 20 as set to the discharge mode, such that water supplied by the water source 60 through the hose 40A is unable to enter the valve unit 20. The hose 40B coupling the robot 12 to the valve unit 20 is represented as empty of water as a result of the water within the hose 40B being drained from the hose 40B via the discharge port 32 of the valve unit 20. Such draining occurs at least in part by gravity due to the hose 40B being coupled to the elevated inlet 16 of the robot 12. Although not shown, draining of the hose 40B through the valve unit 20 may be promoted by other means, including but not limited to a pump coupled to the valve unit 20. As will be discussed in more detailed hereinafter, water flow within the hoses 40A and B can be controlled by an operator or automated through the use of sensors and/or preset directions.

Figure 9:
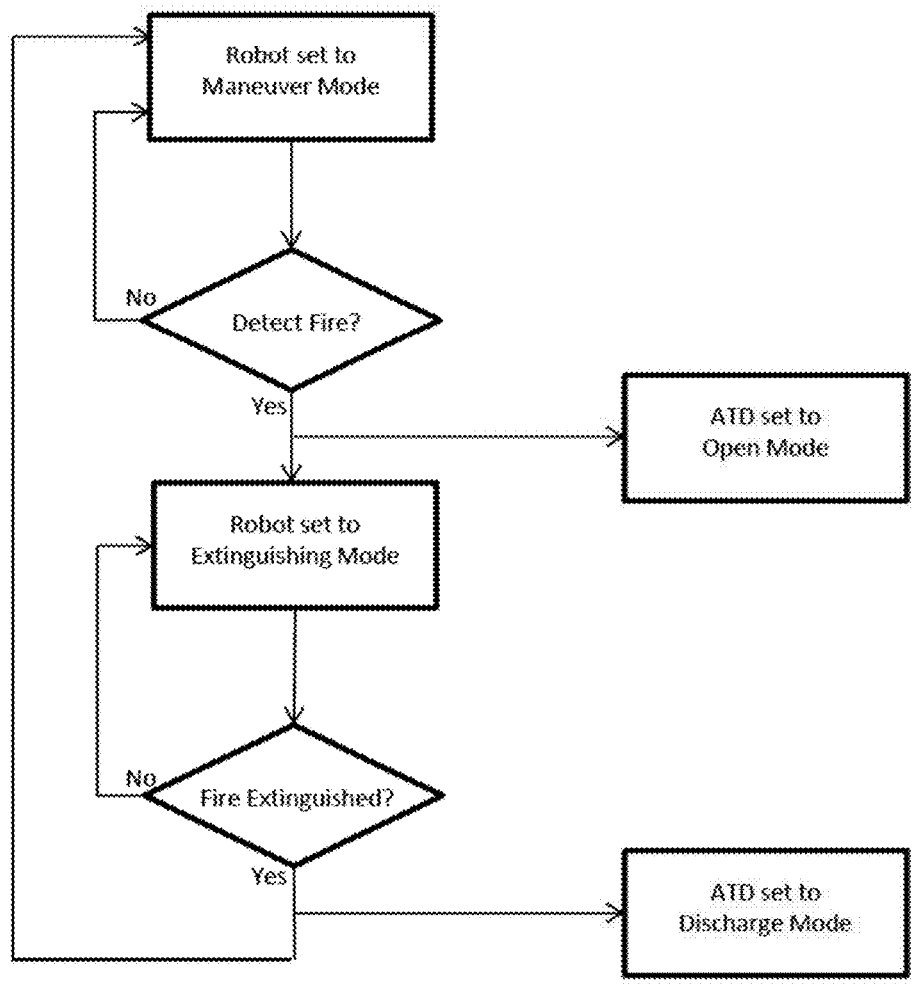
FIG. 9 is a flow chart schematically representing a nonlimiting method for operating a system comprising a firefighting robot coupled to a water source via a hose and an ATD.

FIG. 9 is a flow chart schematically representing steps for the operation of the system of FIGS. 7 and 8 according to a nonlimiting method. The robot 12 may be operated to continuously or periodically sense the locations of fires within a fire scene. During its operation, the robot 12 will typically be commanded to maneuver from one location to another within the fire scene, during which time the attached hoses 40A and B must be dragged. The system described in reference to FIGS. 7 and 8 enable the hose 40B connecting the valve unit 20 to the robot 12 to be drained of water to reduce the drag on the robot 12 attributable to the weight of the water within the hose 40B. If the robot 12 detects a fire, the robot 12 may stop maneuvering and the valve unit 20 may be automatically or manually set to the open mode such that water can flow from the water source 60 through the valve unit 20 to the robot 12. In addition, the robot 12 may be automatically or manually set to an extinguishing mode wherein the robot 12 preferably remains in a fixed, stationary location and sprays water from the water source 60 onto the fire to extinguish the fire. The robot 12 may continuously or periodically sense to determine if the fire has been extinguished.

Once the fire has been extinguished, the valve unit 20 may be automatically or manually set in the discharge mode such that water may drain from the hose 40B coupling the valve unit 20 to the robot 12. Preferably, the discharge port 32 of the valve unit 20 is located near or below a lowermost portion of the hose 40B such that substantially all of the water within the hose 40B drains therefrom. After the hose 40B has been drained, the robot 12 may again be set to the maneuver mode and move about the fire scene until it detects another fire, repeating the method as desired until all fires have been extinguished or the robot 12 is otherwise deactivated. Consequently, whenever the robot 12 changes from the maneuver mode to the extinguishing mode, the valve unit 20 is preferably changed from discharge mode to open mode. On the other hand, whenever the robot 12 changes from the extinguishing mode to the maneuver mode, the valve unit 20 is preferably changed from open mode to discharge mode. It is foreseeable that, as the robot 12 maneuvers between locations dragging the hoses 40A and B, the valve unit 20 will also be inherently towed by the robot 12.

The method of FIG. 9 may be implemented in various ways. For example, an operator may manually operate the robot 12 and the valve unit 20 separately. Alternatively, an operator may manually operate the robot 12, and the valve unit 20 may automatically change between the open and discharge modes upon, for example, receiving a signal or otherwise sensing that the robot 12 has been changed between maneuver and extinguishing modes. It is also within the scope of the invention that the robot 12 and/or the valve unit 20 may be controlled via a computer through the use of sensors and/or preset directions, for example, computer operating software. Regardless of the means, both the robot 12 and the valve unit 20 are preferably configured to be operated wirelessly, since during use they may be located in areas that could be dangerous to access, such as within a building that is on fire.

To predict improvements in traction efficiencies when the robot 12 is moving on a surface, frictional forces were calculated on the basis of an empty fire hose and a fire hose that is full of water. Because most sheaths of fire hoses are made of rubber polymers, a frictional coefficient of rubber was applied for the frictional force calculation. Information regarding frictional coefficients of various materials that were used in the calculations are shown in Table 1 below:

TABLE 1

| Frictional Coefficient ($\mu$) | | |
| --- | --- | --- |
| Rubber and Materials Combination | Static Frictional Coefficient($\mu_s$) | Kinetic Frictional Coefficient($\mu_k$) |
| Rubber | 1.16 | 0.928 |
| Dry Asphalt | 0.85 | 0.67 |
| Wet Asphalt | | 0.53 |
| Dry Concrete | 0.9 (~1.0) | 0.68 (~0.8) |
| Wet Concrete | | 0.58 |
| ICE | 0.18 | 0.15 |

As a nonlimiting example, the static frictional coefficient ($\mu_s$) of rubber on dry asphalt is 0.85 and the kinetic frictional coefficient ($\mu_k$) is 0.67. At four degrees centigrade, one liter of water has a mass approximately equal to one kilogram as represented in Table 2 below.

TABLE 2

| Density and Volume of Water | | |
| --- | --- | --- |
| Temp (° C.) | Density (kg/l) | Volume (l) |
| −7 | 0.99892 | 1.00108 |
| −4 | 0.99945 | 1.00055 |
| −1 | 0.99979 | 1.00021 |
| 4 | 1.00000 | 1.00000 |
| 7 | 0.99993 | 1.00007 |
| 10 | 0.99973 | 1.00027 |
| 15 | 0.99913 | 1.00087 |
| 20 | 0.99823 | 1.00177 |
| 25 | 0.99708 | 1.00293 |
| 30 | 0.99568 | 1.00434 |
| 50 | 0.98807 | 1.01192 |
| 100 | 0.95838 | 1.41623 |

The weight of a fire hose having an internal diameter of 2.5 inch (6.35 cm) and a length of 200 feet (about 61 m) is about 56 kilograms and the volume of water in such a hose is input 198.9975 liters, resulting in a combined weight of approximately 255 kilograms. The frictional force was calculated by a formula as follows:

$$F = \mu m g \quad (1)$$

$$W = Fs \quad (2)$$

where F is the frictional force between the hose and the surface on which it moves, $\mu$ is the frictional coefficient, m is the mass (of water and fire hose), and g is the acceleration due to gravity. W is work done in moving the robot 12 a distance s.

Case 1: Fire hose with water.

$$Fs = 0.85 \times 255 \text{ kg} \times 9.8 \text{ m/s2} = 2124.15 \text{ N} \quad (3)$$

$$Fk = 0.67 \times 255 \text{ kg} \times 9.8 \text{ m/s2} = 1674.33 \text{ N} \quad (4)$$

$$W \text{ (per one hour)} = 1674.33 \text{ N} \times 4000 \text{ m} = 6697320 \text{ J} = 24V/26.6 \text{ Ah} \quad (5)$$

Case 2: Fire hose without water.

$$Fs = 0.85 \times 56 \text{ kg} \times 9.8 \text{ m/s}^2 = 466.48 \text{ N} \quad (6)$$

$$Fk = 0.67 \times 56 \text{ kg} \times 9.8 \text{ m/s}^2 = 367.696 \text{ N} \quad (7)$$

$$W \text{ (per one hour)} = 367.696 \text{ N} \times 4000 \text{ m} = 1470784 \text{ J} \quad (8)$$

$$6697320 \text{ J}: 1470784 \text{ J} = 24\text{V}/26.6 \text{ Ah}: X \quad (9)$$

$$X = 24\text{V}/5.841 \text{ Ah} \quad (10)$$

wherein X is work done in one hour without water in the hose.

Thus, assuming that the system completely drains the water from the hose, the robot 12 would use just 24V/5.841 Ah power and thereby economize the power demand by up to about 78%. This means the robot 12 can constantly move up to 6.84 hours with an empty fire hose. This comparison is further shown in Table 3 below. Due to the longer operating time, the firefighting robot 12 may not need to be replaced with another robot or have its battery recharged during the fire, as may otherwise be the case.

TABLE 3

Power demand and operating time of the firefighting robot

| | Extinguishing mode | Maneuver With water | Maneuver Without water |
|---|---|---|---|
| Power demand | 24 V/5 Ah | 24 V/26.6 Ah | 24 V/5.841 Ah |
| Operating time | 8 hours | 1.5 hours | 6.84 hours |

Total Pressure Loss (TPL) is the sum of friction loss (FL), appliance loss (AL), and elevation loss/gain (EL/EG).

$$TPL = FL + AL +/- (EL/EG) \quad (11)$$

Friction loss (FL) is the pressure used to overcome resistance while forcing water through, for example, fire hoses, pipes, and appliances. To calculate the friction loss, it is necessary to know the size and length of the hose and the volume or quantity of water flowing through the hose. Friction loss is independent of pressure when the flow rate remains constant in the same size hose. In other words, if 200 gpm (757 lpm) is flowing through a 2.5 inch (6.35 cm) hose at 50 psi (about 345 kpa), the friction loss will remain the same if the pressure is increased to 100 psi (about 690 kpa). Thus, $$FL = C \times (Q/100)^2 L/100 \quad (12)$$

where FL is the friction loss, C is the friction loss coefficient (See Table 4 below), Q is the flow rate, and L is the length of the hose.

TABLE 4

Friction Loss Coefficient (From: National Fire Protection Association (NEPA) Fire Protection Handbook, 20th Edition) Friction Loss Coefficient

| Diameter (inch) | Coefficient |
|---|---|
| 0.75 | 1100 |
| 1 | 150 |
| 1.25 | 80 |
| 1.5 | 24 |
| 1.75 | 15.5 |
| 2 | 8 |
| 2.5 | 2 |
| 3 | 0.667 |
| 3.5 | 0.34 |
| 4 | 0.2 |
| 4.5 | 0.1 |
| 5 | 0.08 |

Assuming a friction loss coefficient (C) for a 2.5 inch (6.35 cm) hose is two, the hose length (L) is 200 feet (about 61 meters), and the flow rate (Q) as 300 gpm (1,136 lpm), the friction loss may be calculated as:

$$FL = 2 \times (300/100)^2 \times 200/100 = 36 \text{ psi} \quad (13)$$

Therefore, it was calculated that there is 36.0 psi (about 248.2 kpa) of friction loss for a 200 feet (about 61 meters) section of 2.5 inch (6.35 cm) hose with 300 gpm (1136 lpm) of water passing through it.

Appliance loss: Every water appliance used in the fire service, from a simple wye to a ladder pipe, has friction loss, which is commonly called appliance loss. Friction loss in small appliances is negligible and therefore will not be calculated herein. In general, 25 psi for friction loss should to be added for a deck gun when mounted on a fire engine and 15 psi when used as a ground monitor.

Elevation Gain or Loss: When hoses are at an elevation that is higher or lower than the pump an additional factor known as "Elevation Pressure" (EP) should be considered. A column of water one foot (about 0.3 m) high exerts a downward pressure of 0.434 psi (about 3 kpa). This gain or loss is estimated to be about 10 to 12 feet (3 to 3.65 m) high. The downward pressure of a liquid is directly proportional to its depth up to about 12 feet (3.65 m) high. Therefore, a one-inch by one-inch (2.54×2.54 cm) column of water standing one foot (about 30 cm) tall will have a pressure at its base of about 0.434 pounds (0.197 kg). The pressure will increase by 0.434 pound for every foot added to the height.

$$EL \text{ for the firefighting robot} = 3 \text{ (ft)} \times 0.434 = 1.302 \text{ psi} \quad (14)$$

Thus, there is 1.302 psi (8.977 kPa) of elevation loss for 3 feet (0.91 m) height of a firefighting robot that will occur in the fire hose. Therefore, a volume of 300 gpm (1136 lpm) at a pressure of 400 psi (2758 kPa) of water is calculated as passing through a 200 foot (about 61 meters) section of 2.5 inch (6.35 cm) hose. Consequently, 36.0 psi (about 248.2 kpa) of friction loss and 1.302 psi (8.977 kPa) of elevation loss will occur from 400 psi (2758 kPa) internal pressure. Therefore, the output of the firefighting robot will be about 362.7 psi (2501 kPa).

To calculate the total pressure loss, it was again assumed that a volume of 300 gpm (1136 lpm) at a pressure of 400 psi (2758 kPa) of water was within the hose. Equation 15 describes the free flow in a fire hose, where Q is the amount of water discharged from an inclined part of the fire hose.

$$Q = 0.61 \, A \{2(g^* \cos \theta)(h_u - h_d)\}^{1/2} \quad (15)$$

where 0.61 is the discharge coefficient, A is the area of the hole ($m^2$), g is the acceleration due to gravity, $h_u$ is the upstream water height (m), and $h_d$ is the downstream water height (m).

Figure 10:
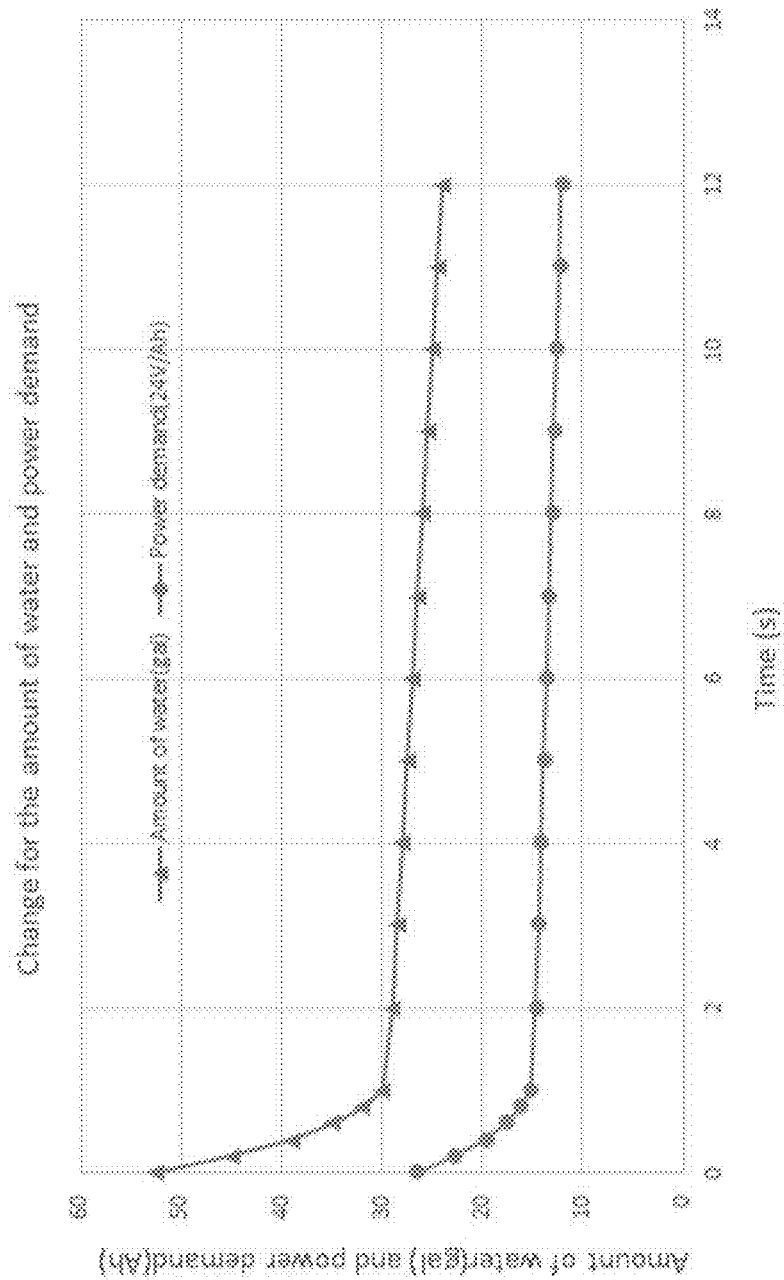
FIG. 10 is a plot representing, as a function of time during water discharge, the amount of water in the fire hose and the power demand for the robot represented in FIGS. 7 and 8.

Due to the gap between the height of the firefighting robot and ground, the water in the first several feet of a fire hose (for example, measured from the inlet 16 of the robot 12) will likely be easily discharged. However, if only one valve unit is used for 200 feet fire hose, it is likely that a majority of the hose that lays on flat ground will not drain much water due to the closing of the flexible fire hose by forces such as gravity, the frictional force in the fire hose, etc. For example, FIG. 10 shows a plot of the amount of water in a 200 foot long fire hose and power demand for the firefighting robot 12, as a function of time during the water discharge process utilizing a single valve unit 20 in the discharge mode. As represented, a single valve unit 20 could not overcome the forces to discharge all of the water in 200 feet of hose.

Figure 11:
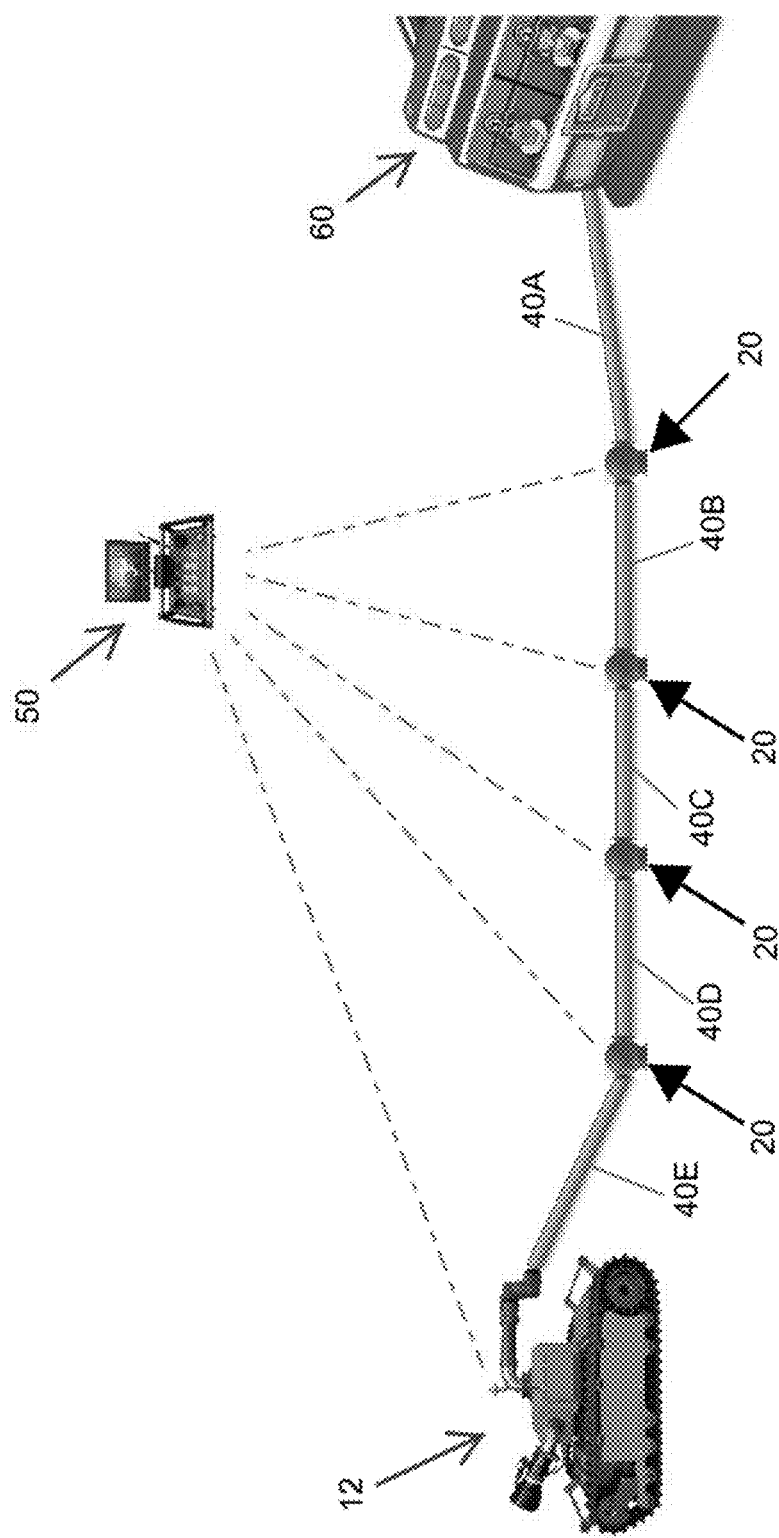
FIG. 11 schematically represents a second nonlimiting system incorporating the robot of FIG. 3, a hose that connects the robot to a water supply, and multiple ATDs of the type shown in FIGS. 4 through 6, wherein the ATDs are represented as strategically located along the length of hose.
Figure 12:
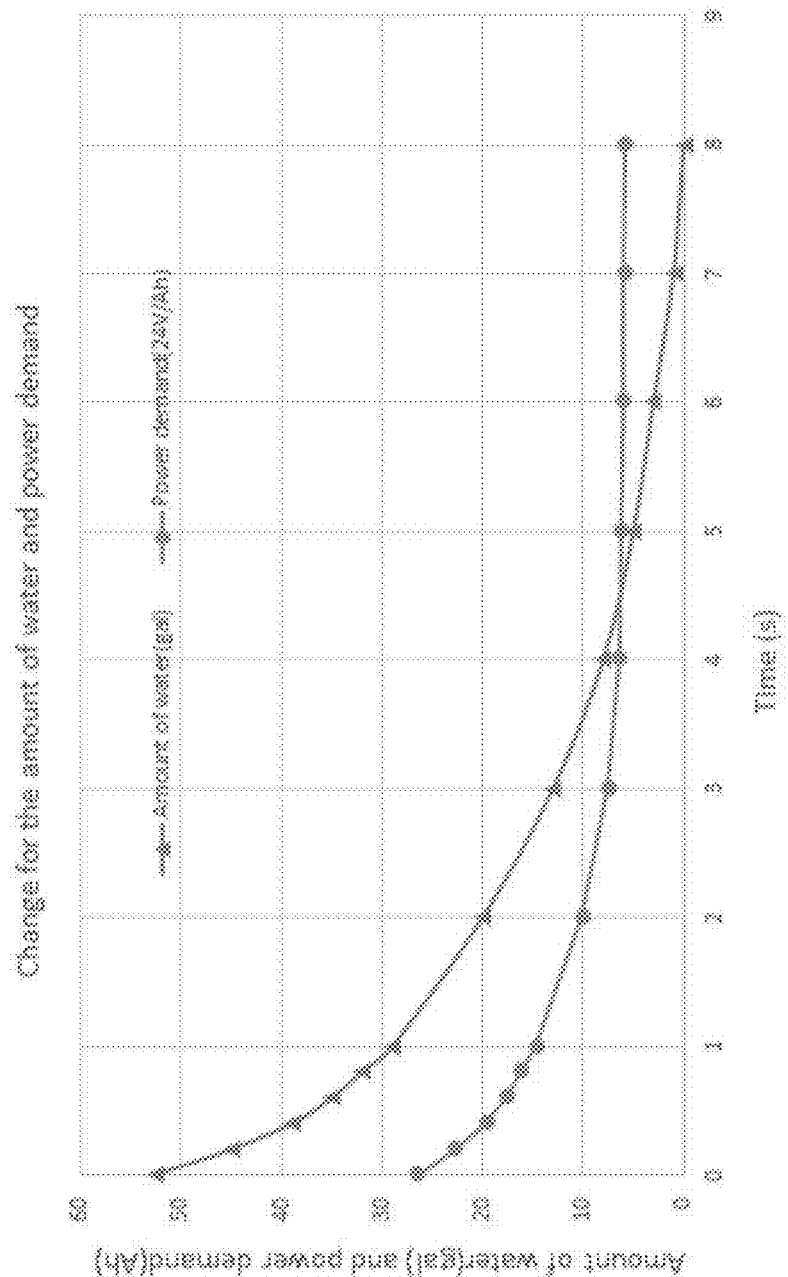
FIG. 12 is a plot representing, as a function of time during water discharge, the amount of water in the fire hose and the power demand for the robot represented in FIG. 11.

Consequently, to ensure more complete drainage of a fire hose will occur, additional valve units 20 may be added to the system to decrease the length of hoses between valve units 20 and thereby decrease the frictional force and the probabilities of the fire hose closing. FIG. 11 represents a nonlimiting system comprising multiple valve units 20 interconnecting multiple hoses 40A-E, each of which is shorter in length than the hoses 40A and B of FIGS. 7 and 8. Such an arrangement decreases the forces that inhibit drainage of the hoses 40B-E, and leads to an increase in an amount of water drained from each hose 40B-E located between at least one valve unit 20 and the robot 12. Although the system is described as including multiple individual hoses 40A-E connected by multiple valve units 20, it is within the scope of the invention that the water source 60 may be coupled to the robot 12 with a single hose comprising multiple valve units 20 as integral components of the hose. As represented in FIG. 12, the use of multiple valve units 20 over a given total length of hoses 40A-E greatly increased the predicted amount of water discharged from the hoses 40B-E and reduced power demand on the robot 12.

In view of the above calculations, it was determined that an increase in length of a hose causes an increase in the frictional force acting on the water within the hose. Therefore, if drainage of the hoses 40B-E in FIG. 11 are primarily accomplished by gravity, it is preferred that individual sections of the hoses 40BA-E between the robot 12 and the valve units 20 are short enough such that substantially all of the water within the hoses 40B-E can drainage in order to provide the largest reduction in weight being towed by the robot 12 during movement. It is foreseeable that during use of the robot 12, as the robot 12 maneuvers to locations progressively farther from the water source 60, additional hoses and valve units 20 may be added in series to the system in order to increase the operational area of the robot 12 while only using individual hoses have a desired maximum length. It should be understood that preferred dimensions of the hoses may vary depending on various parameters, including but not limited to the specific robot 12, the height of its inlet 16 above ground, the slope, if any, of the ground, whether a pump or other device is used to assist in drainage of the hoses, etc.

Systems and methods as disclosed herein are intended to enable a firefighting robot to increase operating time and to effectively extinguish a fire while managing the amount of water in a fire hose coupled to the robot. By reducing the weight of the fire hose during movement of the robot, such systems and methods are believed to be capable of increasing battery life and therefore operating time of the robot, increase mobility of the robot, and reduce the likelihood of firefighters being placed in dangerous situations.

While the invention has been described in terms of specific or particular embodiments, it should be apparent that alternatives could be adopted by one skilled in the art. For example, the system, robot 12, valve unit(s) 20, and their components could differ in appearance and construction from the embodiments described herein and shown in the drawings, functions of certain components of the system could be performed by components of different construction but capable of a similar (though not necessarily equivalent) function, and various materials could be used in the fabrication of the components of the system. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A system comprising:
   at least first and second hoses adapted to receive water from a water source;
   a robot coupled to the first hose such that the first hose is connected in series between the robot and the second hose, the first hose being attached to an inlet of the robot and from the inlet the first hose directly hangs downward onto a surface on which the robot moves, the robot having a maneuvering mode in which the robot moves on the surface by self propulsion and during which time the first and second hoses are dragged behind the robot so as to result in frictional forces between the first and second hoses and the surface on which the robot is moving, the robot having an extinguishing mode in which the robot receives the water through the first and second hoses from the water source and discharges the water towards a fire to extinguish the fire;
   at least a first valve unit fluidically coupling the first hose to the second hose; and
   a controller for controlling the robot and the first valve unit such that the first valve unit prevents the robot from receiving water from the water source and the second hose and drains water from within the first hose but not the second hose when the robot is in the maneuvering mode and provides water to the robot through the first and second hoses from the water source when the robot is in the extinguishing mode.

2. The system of claim 1, wherein the first valve unit is configured to operate in an open mode and a discharge mode, the open mode providing the water to the first hose from the water source and the second hose, and the discharge mode draining the water from within the first hose but not the second hose.

3. The system of claim 2, wherein the first valve unit comprises at least first, second, and third ports, the first port being fluidically coupled to the second hose, the second port being fluidically coupled to the first hose, the open mode providing for a flow path for the water between the first and second ports with the third port blocked, the discharge mode providing for a flow path for the water between the second and third ports with the first port blocked.

4. The system of claim 2, wherein the first valve unit is configured to operate in the open mode when the robot detects a fire and to operate in the discharge mode when the robot detects that the fire has been extinguished.

5. The system of claim 1, further comprising a second valve unit that couples the second hose to the water source, and the second valve unit is controlled with the controller such that the second valve unit drains water from within the second hose when the robot is in the maneuvering mode and provides water to the second hose from the water source when the robot is in the extinguishing mode.

6. The system of claim 1, wherein the controller is wirelessly connected with the robot and the first valve unit.

7. The system of claim 2, wherein the controller controls the first valve unit to automatically operate in the open mode whenever the robot operates in the extinguishing mode and controls the first valve unit to automatically operate in the discharge mode whenever the robot operates in the maneuvering mode.

8. The system of claim 7, wherein the first valve unit drains the water from the first hose in response to the robot receiving a signal to maneuver to a location.

9. The system of claim 7, wherein the first valve unit provides water to the first hose in response to the robot receiving a signal to extinguish a fire.

10. The system of claim 1, wherein the first valve unit is configured to drain water from the first hose prior to the robot maneuvering between two locations.

11. The system of claim 1, wherein the first valve unit comprises a rotating T-valve ball, a motor for rotating the T-valve ball to operate the first valve unit in an open mode and a discharge mode, and a wireless receiver for wirelessly connecting the first valve unit to the controller.

12. A method comprising:
deploying a robot to fight a fire with water from a water source, the robot being connected to the water source through at least first and second hoses that receive the water from the water source, the first hose being attached to an inlet of the robot and from the inlet directly hangs downward onto a surface on which the robot moves, the second hose being connected in series between the first hose and the water source, the robot having a maneuvering mode in which the robot moves on the surface by self propulsion and during which time the first and second hoses are dragged behind the robot so as to result in frictional forces between the first and second hoses and the surface on which the robot is moving, the robot having an extinguishing mode in which the water passes to the robot through the first and second hoses and through at least a first valve unit that couples the first hose to the second hose;
controlling the robot and the first valve unit such that the water is provided to the robot through the second hose, the first valve unit and the first hose when the robot is in the extinguishing mode and discharging the water from the water source toward a fire; and
controlling the robot and the first valve unit such that the robot is prevented from receiving the water from the water source through the first valve unit and the water is drained from the first hose through the first valve unit but the first valve does not drain the water from the second hose when the robot is in the maneuvering mode and dragging the first hose behind the robot.

13. The method of claim 12, further comprising operating the first valve unit in an open mode to provide the water to the first hose from the water source and the second hose, and in a discharge mode to drain water from within the first hose but not the second hose.

14. The method of claim 13, wherein the first valve unit comprises at least first, second, and third ports, the first port fluidically being coupled to the second hose, the second port being fluidically coupled to the first hose, the open mode providing for a flow path for the water between the first and second ports with the third port blocked, the discharge mode providing for a flow path for the water between the second and third ports with the first port blocked.

15. The method of claim 13, further comprising operating the first valve unit in the open mode when the robot detects the fire and in the discharge mode when the robot detects that the fire has been extinguished.

16. The method of claim 12, further comprising a second valve unit that couples the second hose to the water source, the method comprising controlling the second valve unit such that the second valve unit drains water from within the second hose when the robot is in the maneuvering mode and provides water to the second hose from the water source when the robot is in the extinguishing mode.

17. The method of claim 12, wherein the controlling steps comprise wirelessly controlling the robot and the first valve unit with a wireless control system.

18. The method of claim 13, wherein the controlling steps comprise controlling the first valve unit to automatically operate in the open mode whenever the robot operates in the extinguishing mode and controlling the first valve unit to automatically operate in the discharge mode whenever the robot operates in the maneuvering mode.

19. The method of claim 12, wherein the step of controlling the robot and the first valve unit to prevent the robot from receiving the water from the water source comprises draining at least a majority of the water from the first hose through the first valve unit prior to the robot maneuvering between two locations.

20. The method of claim 13, wherein the first valve unit comprises a rotating T-valve ball, the method comprising rotating the T-valve ball to operate the first valve unit in the open and discharge modes.

\* \* \* \* \*